United States Patent [19]
Smith

[11] 4,008,507
[45] Feb. 22, 1977

[54] AXLE MOUNTINGS
[76] Inventor: Joseph Smith, 177A Hobson St., Auckland, New Zealand
[22] Filed: Dec. 30, 1975
[21] Appl. No.: 645,346
[30] Foreign Application Priority Data
Oct. 21, 1975  New Zealand .................. 179002
[52] U.S. Cl. .............................. 16/34; 280/43.24
[51] Int. Cl.² ............................. B60B 33/06
[58] Field of Search .................. 16/32, 33, 34; 280/43.1, 43.14, 43.24

[56] References Cited
UNITED STATES PATENTS

| 2,698,454 | 1/1955 | Meyer | 16/32 |
| 3,260,533 | 7/1966 | Ryder | 16/32 X |

Primary Examiner—Andrew V. Kundrat
Attorney, Agent, or Firm—Cushman, Darby & Cushman

[57] ABSTRACT

This invention relates to an axle mounting including a plate having first and second interconnected slot portions provided therein. The first slot portion is longer than the second slot portion and the slot portions are interconnected into a substantially "j" configuration and are adapted so as to accommodate an axle movable therein. The arrangement is such that in use the plate is secured to a movable article with the slot portions substantially vertical such that transporting means connected to the axle are engageable and disengageable with an adjacent surface or floor as the axle is moved between the slots. In a further form of the invention an axle mounting includes a first plate and a second plate. The second plate is pivotally mounted on the first plate and the first and second interconnected slot portions are provided in each of the plates, the first slot portions being longer than the second slot portions and in each plate the first and second slot portions being interconnected to form a substantially "j" shaped formation. The arrangement of the invention is such that in use, the raising and lowering of an article to which the plates are attached, causes the axle to move between the first and second slot portions the second plate pivoting about the first plate so as to enable the axle movement to take place.

4 Claims, 4 Drawing Figures

AXLE MOUNTINGS

This invention relates to improvements in and relating to axle mountings.

It is an object of this invention to provide an axle mounting which is capable of being attached to a movable article, such that the axle is able to be moved into a position in which transporting means attached thereto or mounted thereon, facilitate the movement of the movable article, or into a further position in which the movable article is able to be firmly and positively located in a desired or predetermined position.

It is a further object of this invention to provide a straight forward and efficient axle mounting.

According to one aspect of this invention there is provided an axle mounting including a plate; first and second interconnected slot portions being provided in the plate; said first slot portion being longer than sid second slot portion; the slot portions being adapted so as to accommodate an axle movable therein and being interconnected at one end thereof; the arrangement being such that in use the plate is secured to a movable article with the slot portions substantially vertical, such that transporting means connected to said axle are engageable and disengageable with an adjacent surface as said axle is moved between the slots.

According to a further aspect of this invention there is provided an axle mounting including a first plate; a second plate being pivotally mounted on said first plate; first and second interconnected slot portions being provided in each of the plates; said first slot portions being longer than said second slot portions; the slot portions being adapted so as to accommodate an axle movable therein, the raising and lowering of an article to which said plates are attached, causing the axle to move between said first and second slot portions; said second plate pivoting about said first plate so as to enable said axle movement to take place.

The invention will now be described by way of example only and with reference to the accompanying drawings, wherein.

Figure 1:
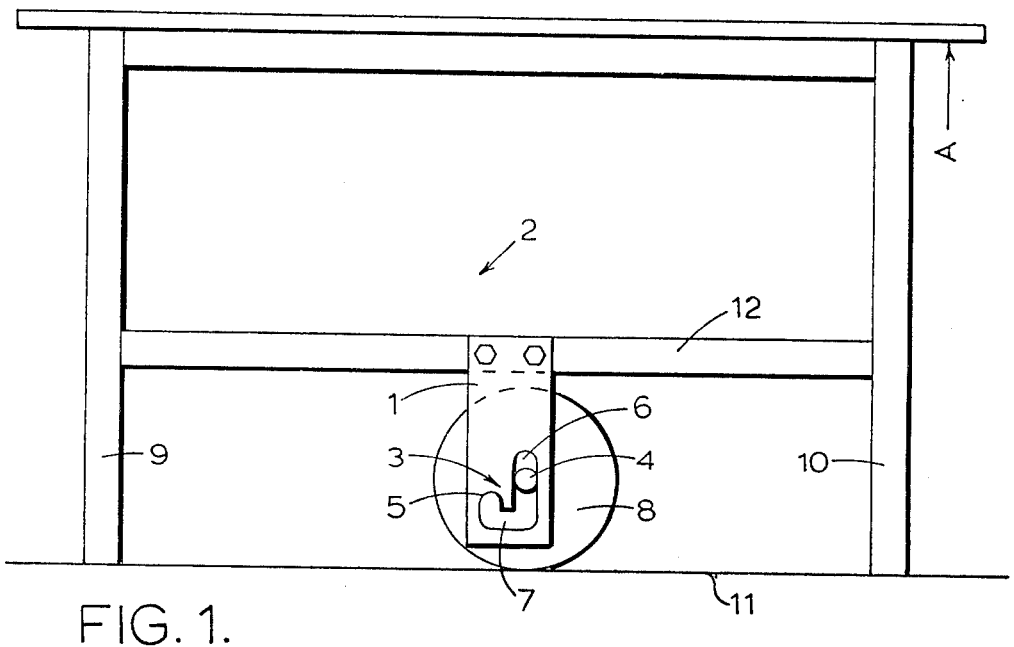
FIG. 1 shows a side view of a movable article in a stationary position.

The present invention has particular application to movable articles of furniture, tables, benches, trolleys, beds, chairs and the like, (hereinafter referred to as a movable article), which have or are able to have attached thereto, axles mounting wheels, castors, rollers, skids or other transporting means (hereinafter referred to as transporting means) which enable the article to be moved from place to place. For the purposes of description and definition, reference will be made throughout the specification and claims, to a movable article. It should be appreciated that this term is used to cover all movable articles in connection, or on which the present invention can be utilized.

Referring now to the accompanying drawings, a movable article such as for example a work bench, table, chair or the like, is generally indicated by numeral 2 and consists of a framework including legs or supports 9 and 10 at opposite ends thereof. A transverse base member 12 has a downwardly directed bracket or plate 1 secured thereto on each side of said article 2. The bracket or plate 1 is secured, for example by means of bolts, screws, welding and the like, to a base transverse member 12 at each side of the movable article 2. The bracket 1 has a substantially "j" shaped slot generally indicated by arrow 3 provided therein, a slot portion 5 being of a shorter length than the slot portion 6. Both slot portions 5 and 6 are directed in a substantially perpendicular direction and are interconnected by a substantially horizontal joining slot portion 7.

An axle 4 which extends the width of the movable article, has transporting means or wheels 8, mounted thereon and preferably at either end thereof. Alternatively, stub axles may be associated with respective wheels or other transporting means at each side of the movable article. In a preferred form of the invention, the transporting means 8 are set or mounted inwardly from the ends of the axle 4, so that the end portions of the axle 4 are free to engage with the slots 3 in the brackets 1.

Figure 2:
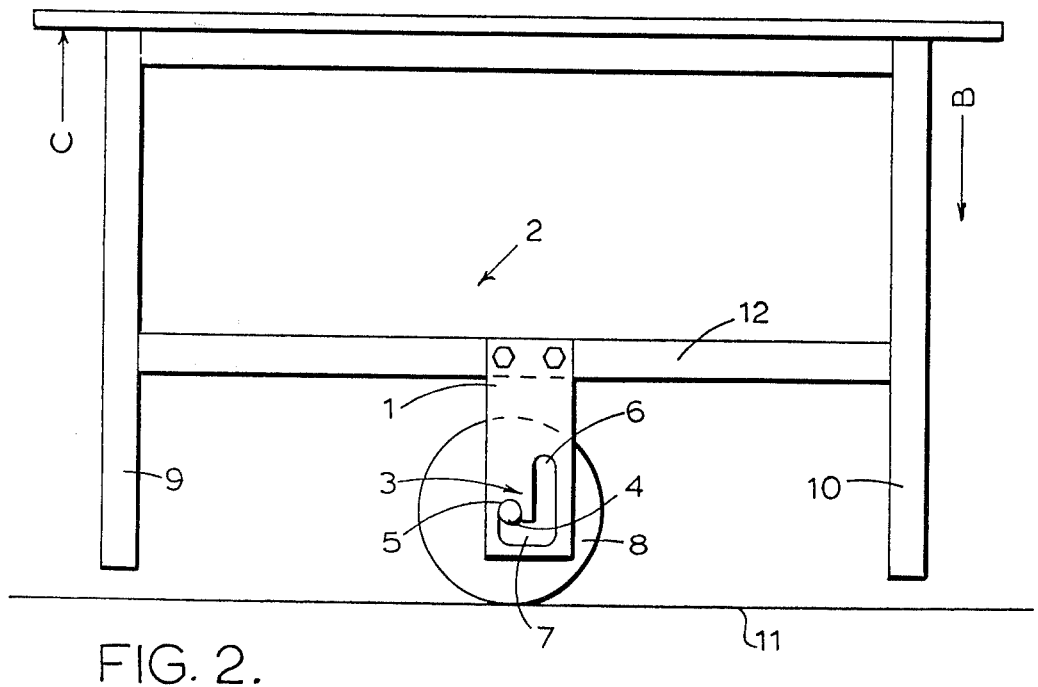
FIG. 2 shows a side view of a movable article in its movable position.

Referring now more particularly to FIG. 1 of the accompanying drawings. In the position shown in FIG. 1 of the drawings, the movable article 2 is firmly resting on the ground or some other surface such as a floor, with legs 9 and 10 abutting the surface 11. However, an upwardly directed force in the general direction of arrow "A" will enable end portions of the axle 4 to roll or slide down a now angled slot portion 7 of the slot 3 and move into the shorter slot portion 5. The movable article is then lowered (such as in the direction of arrow "B" in FIG. 2), enabling the top of the slot portion 5 to rest on the axle 4 so that when the movable article is held in a substantially horizontal position the legs 9 and 10 no longer engage with the ground or floor surface 11, (FIG. 2 of the drawings). In this position the movable article may be moved from place to place, and with an upwardly directed force in the general direction of arrow "C", the axle 4 and the wheels or transporting means 8 mounted thereon, may be returned to the position shown in FIG. 1 of the accompanying drawings in which the legs 9 and 10 are firmly seated on the surface 11.

The movable article 1, may in one form of the invention be provided with a flange or outwardly extending ledge about an upper surface thereof, so that it may be gripped, such as for applying an upward or downward pressure to said movable article.

Figure 3:
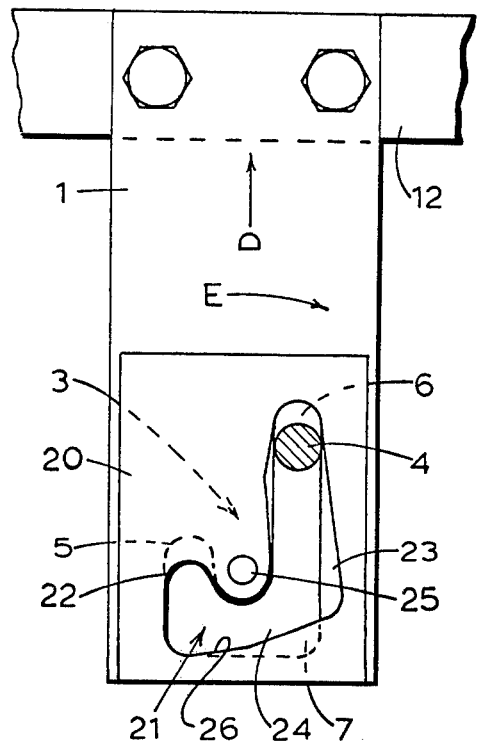
FIG. 3 shows a side view of the axle mounting when a movable article is in a stationary position.
Figure 4:
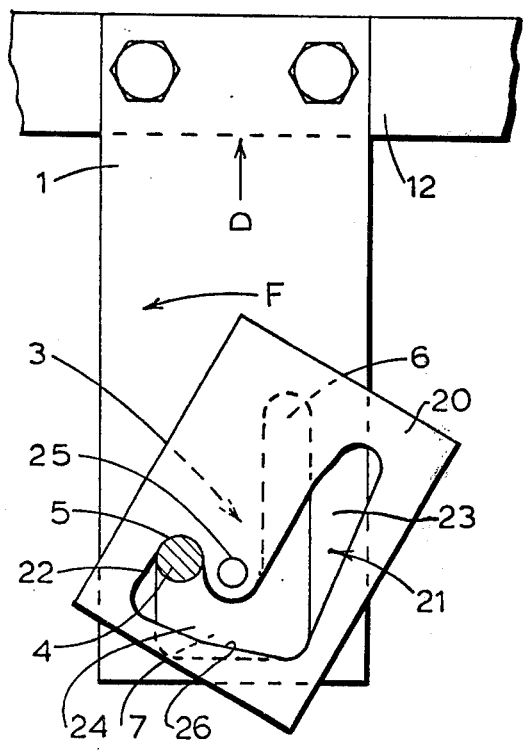
FIG. 4 shows a side view of the axle mounting, when a movable article is in a movable position.

Referring now to FIGS. 3 and 4 of the accompanying drawings. A first plate or the bracket 1 is attached to a lower transverse member 12 of a movable article and has attached thereto a plate member 20 in which is formed a substantially "j" shaped slot indicated by the arrow 21; a first slot portion 22 being shorter in length than a second slot portion 23 and both slot portions 22 and 23 being in one position, directed substantially vertically and being interconnected by a substantially horizontal joining slot portion 24.

The plate member 20 is attached to the bracket 1, by means of a pivot member 25 such as for example a screw, bolt or suitable pivot pin, which holds the plate member 20 and bracket 1 adjacent to each other, relative to said transverse member 12, so that the axle 4 may pass freely through the combined slots 3 (in the bracket 1) and 21 (in the plate member 20).

The pivot member 25 may, but not necessarily so, be restricted from pivoting too freely by control means or by a braking or restriction device, which may consist of a bolt, nut, or spring washers, which may clamp the plate member 20 to the bracket 1 and may be adjusted and locked tight enough to prevent the weight of the axle 4 and the wheel 8 actuating unnecessarily the plate member 20. It should be appreciated therefore that on the tightening and loosening of the control means, the movement between the plate member 20 and the plate member or bracket 1 can be controlled. This control or restricting of the movement of the plate 20 may also be achieved by any other suitable methods and means.

In FIG. 3 of the accompanying drawings the movable article is firmly resting on the ground. However, an upwardly directed force in the general direction of arrow "D" (FIG. 3 of the drawings) will enable each end portion of the axle 4 to roll or slide down a ramp or inclined surface 26 formed by an inclined slot portion 24, and will come to rest at the bottom of the short slot portion 22. A raised end of the movable article is then lowered bringing the axle 4 into contact with the top of the short slot portion 22 which causes the plate member 20 to rotate in the general direction of the arrow "E" (FIG. 3 of the drawings) around the pivot point or member 25 until the axle 4 comes into contact with the top of the shorter slot portion 5 in the bracket 1. Further rotation of the plate 20 is prevented by the braking or restriction of the pivot member 25. The transporting means 8 are then in contact with a desired surface with the legs or supports of the movable article being above and clear of the ground or floor, and in this position (FIG. 4 of the drawings) the movable article may be moved from place to place.

By again lifting either end of the movable article, the axle 4 is again brought into contact with a ramp or inclined surface 26, which being held against the weight of the axle 4 and the transporting means 8 by the controlled or braking action of the pivot member 25, causes the axle 4 to roll or slide down the ramp 26 (in an opposite direction) to come to rest beneath the slot portion 6 of the bracket 1, the raised end of the movable article, then being lowered bringing one side of the longer slot portion 23 of the plate member 20, into contact with the axle 4 which in passing along the slot portions 6 of the bracket 1, causes the plate 20 to rotate in the general direction of the arrow "F" (FIG. 4 of the drawings) thus resetting the ramp or inclined plate 26 (as shown in FIG. 3 of the accompanying drawings), the legs being now on a desired surface and in a predetermined or relatively fixed position.

In this further form of the invention which has been found to have particular application to chairs, the axle mounting enables the wheels or transporting means to be brought into action by raising and lowering any end of a movable article and by again lifting and lowering any end of the movable article to put it back on its feet, runners or base again. The added plate member 20 provides a reversable ramp, which actuated by the axle and weight of the movable article, causes the axle to roll or slide from for example, the long slot portion of the "j" to the short slot portion; whereupon, entering the short slot portion of the "j" and on the movable article being again lifted, it reverses the angle of the ramp in readiness for its return to the long slot portion, and whereupon entering the long slot portion the axle again reverses the angle of the ramp in readiness for return to the short slot portion.

In preferred forms of the invention the axle mounting means is secured on both sides and substantially intermediate ends of a movable article. This has the advantage, that it enables the movable article to be operated in a straight forward and efficient manner, by lifting only one end of the movable article. Also it can be operated in this way, by only one operator. However, it desired, the mounting means can be provided adjacent each end of a movable article.

It should be appreciated that the invention has been described by way of example only and that improvements and modifications may be made to the invention without departing from the scope or spirit thereof, as defined by the appended claims.

I claim:

1. An axle mounting comprising a first plate; a second plate pivotally mounted on said first plate; first and second interconnected slot portions being provided in each of said plates; each of said first slot portions being longer than said second slot portions; said slots being so adapted as to accommodate an axle movable therein; the raising and lowering of either end of an article to which said plates are affixed, causing said axle to move between said first and second slot portions; said second plate pivoting about said first plate so as to enable said axle movement to take place.

2. An axle mounting as claimed in claim 1 and wherein the pivotal movement of said second plate about said first plate includes control means for controlling the pivotal movement therebetween.

3. An axle mounting as claimed in claim 1 and wherein the first and second slot portions are interconnected into a substantially "j" formation.

4. An axle mounting as claimed in claim 2 and wherein the first and second slot portions are interconnected into a substantially "j" formation.

* * * * *